United States Patent
Gupta et al.

(10) Patent No.: US 8,538,466 B2
(45) Date of Patent: Sep. 17, 2013

(54) MESSAGE FILTERING SYSTEM USING PROFILES

(75) Inventors: Shekhar Gupta, Overland Park, KS (US); Pamela K. Gustafson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 811 days.

(21) Appl. No.: 12/363,430

(22) Filed: Jan. 30, 2009

(65) Prior Publication Data
US 2010/0035639 A1 Feb. 11, 2010

Related U.S. Application Data

(63) Continuation-in-part of application No. 12/189,565, filed on Aug. 11, 2008, now Pat. No. 8,352,557.

(51) Int. Cl.
*H04W 4/00* (2009.01)

(52) U.S. Cl.
USPC ......... 455/466; 455/410; 455/418; 455/412.2

(58) Field of Classification Search
USPC .............................. 455/466, 410, 418, 412.2
See application file for complete search history.

(56) References Cited

U.S. PATENT DOCUMENTS

| | | | |
|---|---|---|---|
| 6,393,464 B1 | 5/2002 | Dieterman |
| 6,615,242 B1 | 9/2003 | Riemers |
| 6,732,157 B1 | 5/2004 | Gordon et al. |
| 7,174,453 B2 | 2/2007 | Lu |
| 7,302,272 B2 | 11/2007 | Ackley |
| 7,487,132 B2 | 2/2009 | Auvenshine |
| 7,636,947 B2 | 12/2009 | Peled et al. |
| 7,640,336 B1 | 12/2009 | Lu et al. |
| 7,664,819 B2 | 2/2010 | Murphy et al. |
| 7,693,071 B2 | 4/2010 | Achlioptas et al. |
| 8,001,609 B1 | 8/2011 | Chan et al. |
| 8,099,780 B2 | 1/2012 | Lu |
| 8,135,790 B1 | 3/2012 | Castelli |
| 8,352,557 B2 | 1/2013 | Gupta |
| 2002/0116641 A1 | 8/2002 | Mastrianni |
| 2003/0220978 A1 | 11/2003 | Rhodes |
| 2004/0260924 A1 | 12/2004 | Peled et al. |
| 2005/0010644 A1 | 1/2005 | Brown et al. |
| 2005/0021637 A1 | 1/2005 | Cox |

(Continued)

FOREIGN PATENT DOCUMENTS

WO    WO 2005081664 A2    9/2005

OTHER PUBLICATIONS http://www.parentalsoftware.org/cellphone-spy.html; 4 pgs.
http://www.tango.ie/solutions/parentalcontrol.asp; 1 pg.

(Continued)

*Primary Examiner* — Manpreet Matharu
(74) *Attorney, Agent, or Firm* — Swanson & Bratschun, L.L.C.

(57) ABSTRACT

In one embodiment of the present invention, a system and method of filtering messages may be provided that includes receiving an SMS message intended for a recipient and receiving a user-restriction profile. The system and method includes determining whether the SMS message contains content that is indicated to be restricted by the user-restriction profile and, in response to the determination that the SMS message contains restricted content, delivering the SMS message to an authorized secondary receiver. Alternatively, in response to the determination that the SMS message does not contain restricted content, the SMS message may be delivered to the recipient.

16 Claims, 5 Drawing Sheets

(56) References Cited

U.S. PATENT DOCUMENTS

| | | |
|---|---|---|
| 2005/0041789 A1 | 2/2005 | Warren-Smith et al. |
| 2005/0080854 A1 | 4/2005 | Tervo |
| 2005/0149622 A1 | 7/2005 | Kirkland et al. |
| 2005/0160144 A1 | 7/2005 | Bhatia |
| 2005/0256929 A1 | 11/2005 | Bartol et al. |
| 2006/0031311 A1 | 2/2006 | Whitney et al. |
| 2006/0041625 A1 | 2/2006 | Chen et al. |
| 2006/0059238 A1 | 3/2006 | Slater et al. |
| 2006/0174111 A1 | 8/2006 | Burns |
| 2007/0016641 A1 | 1/2007 | Broomhall |
| 2007/0070940 A1 | 3/2007 | Vander Veen et al. |
| 2007/0071213 A1 | 3/2007 | Claudatos et al. |
| 2007/0260603 A1* | 11/2007 | Tuscano et al. ............ 707/9 |
| 2008/0064381 A1 | 3/2008 | Ackley |
| 2008/0070608 A1 | 3/2008 | Ackley |
| 2008/0070609 A1 | 3/2008 | Ackley |
| 2008/0114838 A1 | 5/2008 | Taylor |
| 2008/0162642 A1* | 7/2008 | Bachiri et al. ............ 709/206 |
| 2008/0165944 A1 | 7/2008 | Rosenthal et al. |
| 2008/0293383 A1 | 11/2008 | Rastas |
| 2008/0319949 A1 | 12/2008 | Irving et al. |
| 2009/0006564 A1 | 1/2009 | Kay et al. |
| 2009/0063133 A1 | 3/2009 | Auvenshine |
| 2009/0083385 A1 | 3/2009 | Heredia et al. |
| 2009/0172121 A1 | 7/2009 | Tanaka |
| 2009/0177750 A1 | 7/2009 | Lee et al. |
| 2009/0193075 A1 | 7/2009 | Persinger |
| 2009/0198777 A1 | 8/2009 | LaFreniere et al. |
| 2009/0198778 A1 | 8/2009 | Priebe |
| 2009/0228557 A1 | 9/2009 | Ganz et al. |
| 2009/0299927 A1 | 12/2009 | Chen et al. |
| 2010/0017371 A1 | 1/2010 | Whalin et al. |
| 2010/0017864 A1 | 1/2010 | Codignotto |
| 2010/0036918 A1 | 2/2010 | Gupta |
| 2010/0049814 A1 | 2/2010 | Turakhia |
| 2010/0058178 A1 | 3/2010 | Dong et al. |
| 2011/0258274 A1 | 10/2011 | Yu |
| 2013/0097268 A1 | 4/2013 | Gupta |

OTHER PUBLICATIONS http://www:anam.com/parentalcontrol.php; 1 pg.
http:///www.adaptivemobile.com/Solutions/listcat/16; 2 pgs.
http://www.spy-mobile-phone.com/sms-spy.html; 5 pgs.
Non-Final Office Action date mailed Jun. 22, 2010 for U.S. Appl. No. 12/189,565.
Response filed Sep. 20, 2010 for U.S. Appl. No. 12/189,565.
Interview Summary date mailed Oct. 5, 2010 for U.S. Appl. No. 12/189,565.
U.S. Appl. No. 12/189,565; Notice of Allowance dated Sep. 7, 2012; 13 pages.
U.S. Appl. No. 12/189,565; Issue Notification dated Dec. 18, 2012; 1 page.
U.S. Appl. No. 13/708,750; Non-Final Rejection dated Mar. 5, 2013; 52 pages.
U.S. Appl. No. 12/012,151; Advisory Action dated Jan. 21, 2011; 6 pages.
U.S. Appl. No. 12/012,151; Final Rejection daed Oct. 18, 2010; 23 pages.
U.S. Appl. No. 12/012,151; Non-Final Rejection dated Apr. 28, 2010; 13 pages.
U.S. Appl. No. 12/189,565; Final Rejection dated Dec. 8, 2010; 23 pages.
U.S. Appl. No. 12/189,565; Non-Final Rejection dated Jun. 27, 2012; 23 pages.
U.S. Appl. No. 12/189,565; Non-Final Rejection dated Nov. 4, 2011; 32 pages.
U.S. Appl. No. 12/189,565; Notice of Allowance dated Jun. 8, 2012; 44 pages.

* cited by examiner

MESSAGE FILTERING SYSTEM USING PROFILES

PRIORITY

This application is a continuation-in-part of U.S. patent application Ser. No. 12/189,565, (now U.S. Pat. No. 8,352, 557), entitled: Message Filtering System, filed on Aug. 11, 2008, by Gupta et al., which is incorporated herein by reference.

BACKGROUND OF THE INVENTION

Use of electronic messaging is growing at exponential rates. As the use of electronic messaging increases, additional risks and dangers are presented which require monitoring large amounts of data for inappropriate communications. The use of electronic messaging is even more concerning when one considers the number of children currently using electronic messaging. As has been well documented in the media, electronic messaging is commonly used by sexual predators and others who look to harm children. Monitoring of electronic messaging by parents is very difficult to do in real time, which results to children being exposed to inappropriate and dangerous information.

Currently, parents who are interested in viewing the electronic messages their children send and receive have limited options. Parents can view old e-mails or text messages directly on the child's communication device. In addition, logging software can save copies of the child's electronic messages on a server or workstation. However, these monitoring devices do not act in real time. Also, the parent is required to read all the text messages generated which is very time consuming. A need exists for a monitoring system which will automatically parse every message a child receives for inappropriate content and to notify parents if inappropriate content is received.

SUMMARY OF THE INVENTION

In one embodiment of the present invention, by monitoring SMS messages intended for delivery to a recipient, messages may be automatically filtered using lists of restricted words, user or device profiles, or ratings determined for the SMS messages. Messages may also be filtered based upon sender or recipient address as well as manually, by requiring a third party to review messages and make a delivery determination.

In one embodiment of the present invention, a system and method of filtering messages may be provided that includes receiving an SMS message intended for a recipient and receiving a user-restriction profile. The system and method includes determining whether the SMS message contains content that is indicated to be restricted by the user-restriction profile and, in response to the determination that the SMS message contains restricted content, delivering the SMS message to an authorized secondary receiver. Alternatively, in response to the determination that the SMS message does not contain restricted content, the SMS message may be delivered to the recipient.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
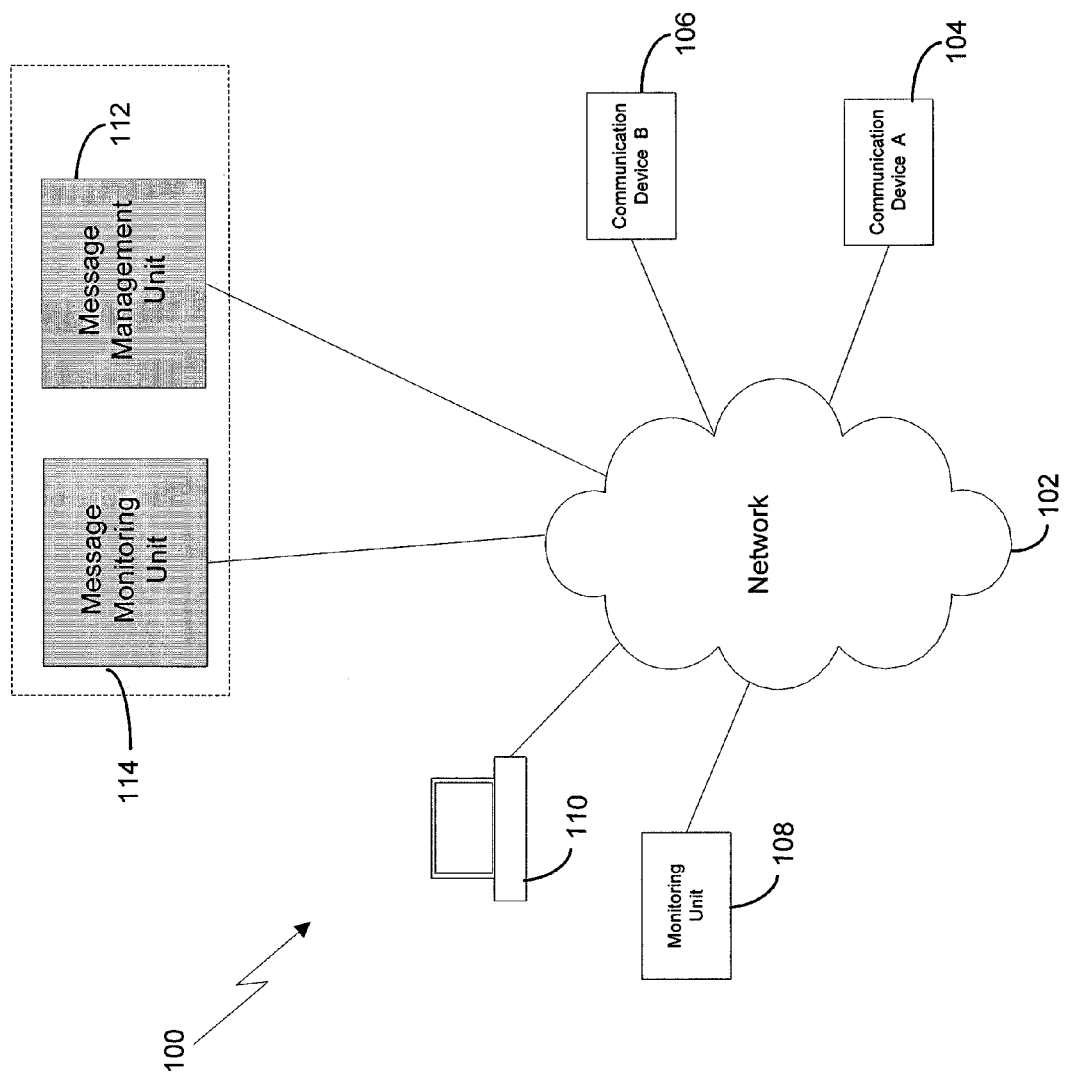
FIG. 1 depicts one embodiment of a message filtering system consistent with the present invention.

Referring now to the drawings which depict different embodiments consistent with the present invention, wherever possible, the same reference numbers will be used throughout the drawings and the following description to refer to the same or like parts.

FIG. 1 depicts one embodiment of a message filtering system 100 consistent with the present invention. The message filtering system 100 includes a network 102, a communication device A 104, a communication device B 106, and a monitoring unit 108. The message filtering system 100 further includes a user terminal 110, a message management unit 112 and a message monitoring unit 114. In general, the message management unit 112 manages and controls the communications traffic of the network 102. The message management unit 112 also routes messages between the communication devices 104 and 106. When the message management unit 112 receives a message from an address of a predetermined communication device 104 and 106 address, it re-routes the message to the message monitoring unit 114. The message monitoring unit 114 compares the contents of the message with identifiers stored in an identifier library (not shown in FIG. 1). If an identifier in the message matches an identifier in the identifier library, the message is forwarded through the message management unit 112 to a monitoring unit 108. The message monitoring unit 114 requests authorization from the monitoring unit 108 to send the message to the destination address. Further, the terminal unit 110 may allow a user to register monitoring unit 108 addresses, communication device 104 and 106 addresses, communication device 104 and 106 addresses from which messages are restricted, and identifiers into one or more libraries stored on the message monitoring unit 114 or the message management unit 112.

In one embodiment, in addition to previously mentioned addresses and identifiers, profiles may also be registered with the message management unit 112 or the message monitoring unit 114. Profiles may include identifiers grouped together and associated with a user, a device, or both. Preferences, such as a profile rating may also be included within or associated with the profiles. The profiles may be stored with the identifiers in the identifier library, in a separate library for profiles, or separately in another storage device (not shown). The profiles may allow for a finer degree of filtering than an identifier list can provide. For example, an identifier list may restrict delivery for all messages intended for delivery to a registered communication device (i.e., 104 or 106) using an identifier list, whereas using profiles may allow for a profile to be selected for each user or device, which may provide different degrees of filtering based upon the profile associated with the user.

Profiles may be generated by users when an account is initially set up. A telephonic menu, operated assisted entry, online entry by the user, or many other methods may be used for generating profile information. In one embodiment, a parent may enter specific words or phrases, in addition to, or in place of, generic words or lists that a user can select from, to have restricted from delivery to either their or their children's phone. At any time the user may be allowed access to update profiles as the need arises.

The profile may contain words or phrases similar to the identifiers. However, by using profiles, an individual determination may be made as to appropriate content based on a device or a user, rather than a blanket denial, as may occur by simply looking for an identifier in a library. For example, in one embodiment, various identifiers that are acceptable for a person would be omitted from the profile, whereas inappropriate identifiers would be retained in the profile. Upon locating an unacceptable identifier, based upon the inclusion within the profile, the message will be blocked, as previously described.

In addition to written identifiers, more frequently, images are being included within SMS messages. In one embodiment, a determination may also be made as to whether an included image may be objectionable. Various software products exist today to help determine if an image might contain things such as violence or nudity. By including an image evaluation module, an option for users to filter certain images may be provided and the preference stored within the profile.

In another embodiment, a profile rating may be assigned to a profile belonging to a user or group of users that may allow entire lists of identifiers to be blocked or allowed based simply on one profile rating. For example, in addition to identifiers, content ratings may be stored whereby a content rating represents a group of identifiers associated with a particular segment of the population (e.g., Youth, Teen, Mature Adult). Identifiers that may be appropriate for an adult may not be appropriate for a youth, and classifying various identifiers within a content rating may allow for a greater degree of message delivery customization with minimal configuring and setup time needed. By comparing a content rating associated with one or more identifiers with the profile rating—if a profile rating is present—a determination of whether to deliver a message can be made more efficiently than using one or more lists of identifiers.

Entire messages may be rated based on the presence of a single identifier, or alternatively, portions of a message may be rated separately. Multiple ratings may be particularly useful for large messages, where there are minimal offensive identifiers. By being able to apply ratings to individual portions of messages, non-offending portions may still be delivered. By comparing the content rating given to the message to the profile rating stored for the intended recipient, the determination to deliver the message may be simplified, while allowing greater flexibility in recognition of age or maturity levels, among other criterion.

Developing ratings for the identifiers contained within messages may occur by using automated or standardized methods before implementation of the message filtering, manually as identifiers are entered, or any number of known ways for rating content. In general, if a word is unrecognized or not rated, procedures described herein may allow for the message to be screened by a secondary device (e.g., a parent's device), as is described for the embodiment employing lists of identifiers.

The message monitoring unit 114 and message management unit 112 may be embodied by one or more servers. Alternatively, each of the message monitoring unit 114 and message management unit 112 may be implemented using any combination of hardware and software, whether as incorporated in a single device or as a functionally distributed across multiple platforms and devices.

In one embodiment, the network 102 is a cellular network, a TCP/IP network, or any other suitable network topology. In another embodiment, the message monitoring unit 114 and the message management unit 112 may be servers, workstations, network appliances or any other suitable data storage devices. In yet another embodiment, message monitoring unit 114 and message management unit 112 may be combined into a single server, workstation, network appliance or suitable data storage device. In another embodiment, the communication devices 104 and 106 may be any combination of cellular phones, telephones, personal data assistants, or any other suitable communication devices. In another embodiment, the monitoring unit 108 may be any combination of cellular phones, telephones, personal data assistants, or any other suitable communication devices. In addition, terminal unit 110 may be a server, workstation, network appliance or any other suitable network terminal device.

In one embodiment, the network 102 may be any private or public communication network known to one skilled in the art such as a local area network ("LAN"), wide area network ("WAN"), peer-to-peer network, cellular network or any suitable network, using standard communication protocols. The network 102 may include hardwired as well as wireless branches.

In another embodiment, the message management unit 112 may be configured to restrict messages between communication devices 104 and 106. The message management unit 112 may be configured to store a list of restricted addresses for each communication device 104 and 106. In addition, the message management unit 112 may be configured to store the address of a monitoring unit 108 where messages from restricted addresses have been previously re-routed and denied delivery.

In yet another embodiment, the message monitoring unit 114 may be configured to store a list of words, profiles, and/or content ratings associated with the lists of words in memory. When a message from a communication device 104 and 106 is received at the message management unit 112, the message management unit 112 may forward the message to the message monitoring unit 114. The message monitoring unit 114 may parse the message for words that match the words, profiles, and/or content ratings associated with the lists of words stored in the memory of the message monitoring unit 114. If a match is found, the message monitoring unit 114 may re-route the message to the monitoring unit 108 for delivery approval.

In another embodiment, the monitoring unit 108 is configured to allow a user to determine if the message may be forwarded on to the original destination address. If the user declines to send the message to the original address, the message is stored on the message monitoring unit 114 and the message is not sent to the destination address. If the user allows the message to pass through, the message monitoring unit 114 transfers the message to the message management unit 112 which transmits the message to original destination addresses of the communication devices 104 and 106.

As an illustrative example of the operation of the message filtering system 101, communication device A 104 transmits a message to communication device B 106. First, the message may be sent to the message management unit 112. The message management unit 112 compares the address of communication device A 104 with a list of addresses stored in memory to determine if communication device A 104 is a registered or restricted address. If communication device A 104 is restricted from sending messages to communication device B 106, the message may not sent to communication device B 106.

If communication device A 104 is a registered unit, the message management software determines if communication device B 106 is a restricted communication device. If communication device B 106 is a restricted address, the message may be stored on the message monitoring unit 114 and the message is not sent. If communication device B 106 is not a restricted unit, the message may be sent to the message monitoring unit 114 which locates words within the message and compares the words to a library of words on the message monitoring unit 114. If any of the words of the message match a word in the library, the message monitoring unit 114 forwards the message to the monitoring unit 108 in real time.

Alternatively, if profile information pertaining to either a user or the device is included within the libraries, as described previously, rather than matching a word in the library, the message monitoring unit 114 may determine matches for words in the profile. Similarly, the rating concept described previously may be used in place of, or in addition to, searching a word list.

In one embodiment, the monitoring unit 108 displays the message to a user, via the monitoring unit 108. The user may be given the option of allowing transmission of the message to communication device B 106 or denying transmission of the message. If the user denies transmission, the message may be stored on the message monitoring unit 114 and may be not sent to communication device B 106. If the user allows transmission, the message may be sent to the message management unit 112 which transmits the message to communication device B 106. In one embodiment, communication device B 106 may be a parent's phone, where communication device A 104 is a child's phone, and the parent is the user that reviews the message for appropriateness of delivery.

Figure 2:
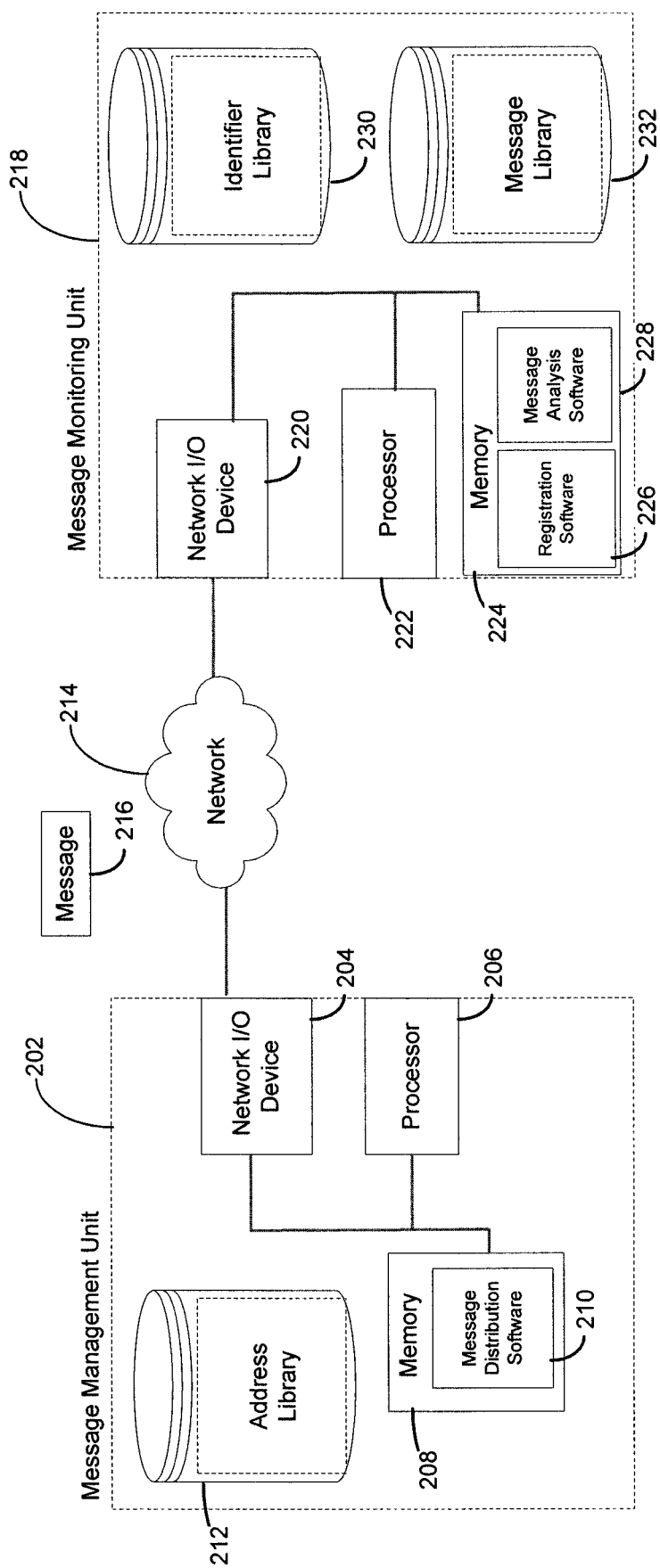
FIG. 2 depicts one embodiment of the message management unit and message monitoring unit consistent with the present invention.

FIG. 2 depicts one embodiment of a message management unit 202 and message monitoring unit 218 consistent with the present invention. The message management unit 202 includes a network I/O device 204, a processor 206, a memory 208 storing message distribution software 210 and an address library 212. The message distribution software 210 running in memory 208 of the message management unit 202 is operatively configured to receive a message 216 from the network I/O device 204 and to extract the sending communication device address as well as the destination communication device address from the message. In addition, the message distribution software 210 is operatively configured to compare the sending communication device address of the message 216 against a list of addresses restricted from sending messages to the destination address. If the sending address is identified in the address library 212, the message is re-routed via the network 214 to the message monitoring unit 218 for further analysis.

In one embodiment, the processor 206 may be a central processing unit ("CPU"), a application specific integrated circuit ("ASIC"), a microprocessor or any other suitable processing device. The memory 208 may include a hard disk, random access memory, cache, removable media drive, mass storage or configuration suitable as storage for data, instructions, and information. In one embodiment, the memory 208 and processor 206 may be integrated. The memory may use any type of volatile or non-volatile storage techniques and mediums. The network I/O line 204 device may be a network interface card, a plain old telephone service ("POTS") interface card, an ASCII interface card, or any other suitable network interface device. The network I/O interface devices 204 and 220 may be a network interface card, a wireless network interface card or any other suitable network interface device. The message distribution software 210 may be a compiled program running on a server, a process running on a microprocessor or any other suitable port control software.

The message monitoring unit 218 includes a network I/O device 220, a processor 222, a memory 224 storing registration software 226 and message analysis software 228, an identifier library 230, and a message library 232. The message analysis software 228 is operatively configured to extract a plurality of identifiers from the body of the message 216. Each identifier extracted is compared to a list of identifiers stored in the identifier library 230. If any one of the identifiers matches an identifier in the identifier library 230, the message 216 is re-routed to a monitoring unit, such as monitoring unit 108 from FIG. 1, via the network I/O device 220.

Alternatively, in an embodiment that includes user profiles, the identifiers may be compared with stored profiles located in the identifier library 230, a separate library, or memory (not shown). If ratings are provided in addition to, or used in place of, an identifier list, the profile ratings described previously may be compared to the content rating.

If the monitoring unit allows the message 216 to proceed to the destination address, the authorization is received by the message monitoring unit 218 via the network I/O device 220 and the message 216 is sent to the message management unit 202 via the network 214. If the monitoring unit denies the message 216, the message is stored in the message library 232.

In one embodiment, the processor 222 may be a central processing unit ("CPU"), a application specific integrated circuit ("ASIC"), a microprocessor or any other suitable processing device. The memory 224 may include a hard disk, random access memory, cache, removable media drive, mass storage or configuration suitable as storage for data, instructions, and information. In another embodiment, the memory 224 and processor 222 may be integrated. The memory may use any type of volatile or non-volatile storage techniques and mediums. The network I/O device 220 may be a network interface card, a plain old telephone service ("POTS") interface card, an ASCII interface card, a wireless transceiver, or any other suitable network interface device. The registration software 226 may be an a web server application, a compiled program running on a server, a process running on a microprocessor or any other suitable registration software. The message analysis software 228 may be a compiled program running on a server, a process running on a microprocessor or any other suitable registration software.

The registration software 226 is operatively configured to interact with a terminal unit, such as terminal unit 110 from FIG. 1. The registration software 226 is configured to collect a listing of communication device addresses between which communication is restricted. The registration software 226 receives the communication device addresses via the network I/O device 220 and forwards the addresses to message distribution software 210 for storage in the address library 212 of the message management unit 202. In addition, the registration software 226 gathers a listing of restricted identifiers for the received communications device addresses which may be stored in the identifier library 230. Alternatively, user profiles or profile ratings may also be generated for embodiments that include the use of profiles or ratings. Various methods of generating a profile or a profile rating may be used. The registration software 226 may interact with the terminal unit using a user interface such as, but not limited to, a web page, a compiled program, a text based ASCII terminal or any other suitable user interface.

In one embodiment, the message analysis software 228 queries online servers to update the list of identifiers, profiles, or profile ratings, available in the identifier library 230. As an illustrative example, the identifiers in the identifier library may be words, such as slang words. In this example, the message analysis software 228 queries web sites which store currently listings of slang words including, but not limited to slang dictionary web sites, text message shorthand dictionary and any other online source of current slang or shorthand messaging words. The message analysis software 228 may be configured to compare the contents of each web site with the current contents in the identifier library 230 and to update the contents of the identifier library 230 as needed.

In another embodiment, the registration software 226 may allow a user to configure the message monitoring unit 218. In an illustrative example, a user located at a terminal unit, such as a cellular phone or workstation, may connect to the registration software 226 on the message monitoring unit 218 via the network 214. The registration software 226 may present a user interface to the terminal unit where the user may enter destination communication device addresses as well as communication device addresses which are restricted from communicating with the destination communication device addresses. In addition, the registration software 226 may query the identifier library 230 and present a complete list of all identifiers to a user on the terminal unit. The user may then select the identifiers which will initiate the re-routing of a message containing the identifier sent to a destination communication device address. In one embodiment, identifiers may be selected and stored in one or more profiles, such as a user profile as described previously, which may be specific to a device or a user. For embodiments including ratings, rating information may also be selected for a user profile using a similar procedure on the terminal unit.

Figure 3A:
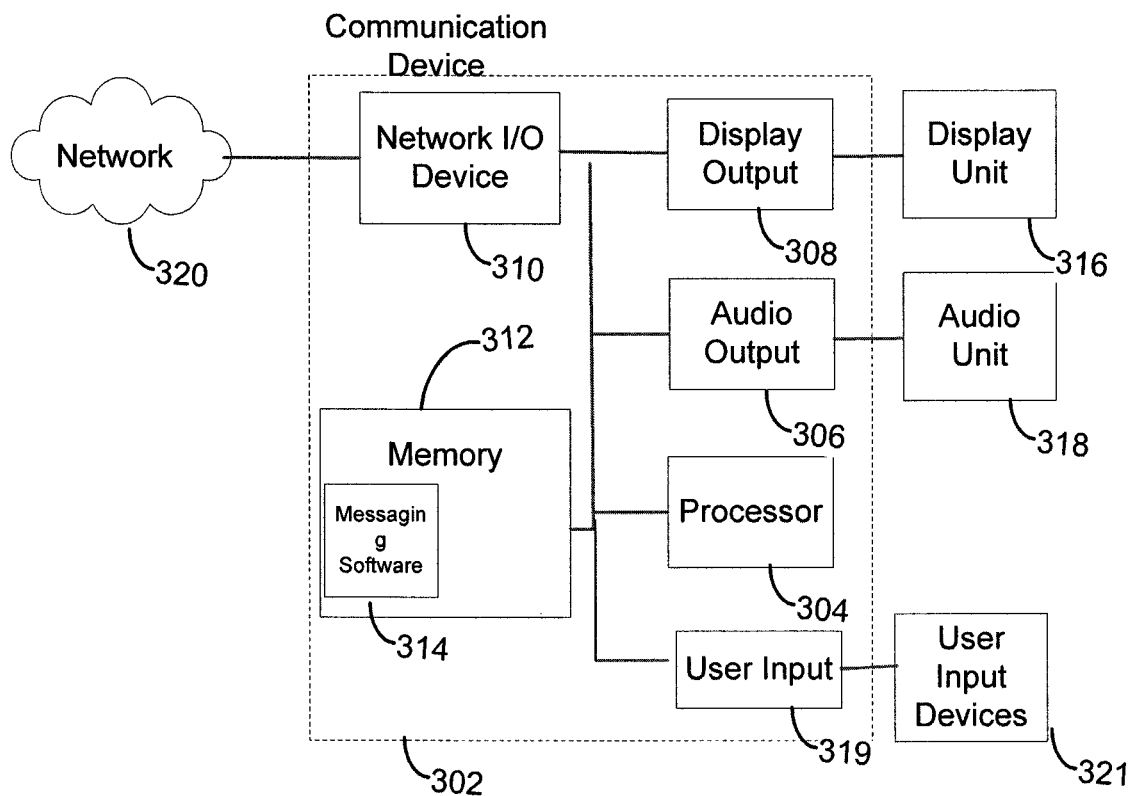
FIG. 3A depicts one embodiment of a communication device consistent with the present invention.

FIG. 3A depicts one embodiment of a communication device 302 consistent with the present invention. The communication device 302 includes a processor 304, an audio output 306, a display output 308, a network I/O device 310, and memory 312 running messaging software 314. The communication device 302 further includes a display unit 316 connected to a display output 308, an audio unit 318 connected to a audio output 306, and a user input 319 connected to a user input device 321, such as but not limited to a mouse or a keypad. The messaging software 314 is operatively configured to send and receive messages over the network 320 via the network I/O device 310. In addition, the processor 304 and messaging software 314 are operatively configured to transmit the message to the display output 308 for presentation on the display unit 316 and also to present an audio tone to the audio output 306 for playing of an audio tone on the audio unit 318.

In one embodiment, the processor 304 may be a central processing unit ("CPU"), a application specific integrated circuit ("ASIC"), a microprocessor or any other suitable processing device. The memory 312 may include a hard disk, random access memory, cache, removable media drive, mass storage or configuration suitable as storage for data, instructions, and information. In one embodiment, the memory 312 and processor 304 may be integrated. The memory may use any type of volatile or non-volatile storage techniques and mediums. The network I/O device 310 may be a network interface card, a plain old telephone service ("POTS") interface card, an ASCII interface card, or any other suitable network interface device. The messaging software 314 may be a short messaging service ("SMS") program, multimedia messaging service ("MMS"), a compiled program running, a process running on a microprocessor or any other suitable registration software.

In one embodiment, the network 320 may be any private or public communication network known to one skilled in the art such as a Local Area Network ("LAN"), Wide Area Network ("WAN"), Peer-to-Peer Network, Cellular network or any suitable network, using standard communication protocols. The network 320 may include hardwired as well as wireless branches.

Figure 3B:
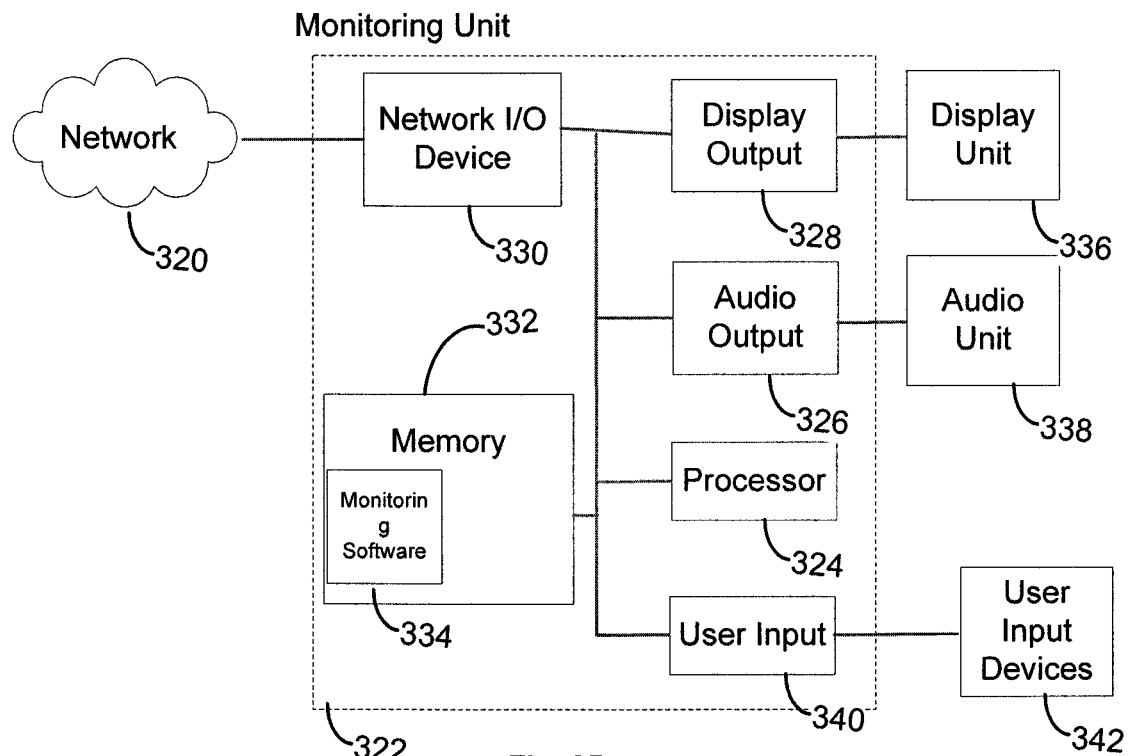
FIG. 3B depicts one embodiment of a monitoring unit consistent with the present invention.

FIG. 3B depicts one embodiment of a monitoring unit 332 consistent with the present invention. The monitoring unit 322 includes a processor 324, an audio output 326, a display output 328, a network I/O device 330, memory 332 running monitoring software 334. The monitoring unit 322 further includes a display unit 336 connected to the display output 328, a audio unit 338 connected to the audio output 326, and a user input 340 connected to a user input device 342, such as but not limited to a keyboard or a mouse. The monitoring software 314 is operatively configured to send and receive messages to and from the message monitoring unit, such as the message monitoring unit 218 of FIG. 2, over the network 320 via the network I/O device 330. In addition, the processor 324 and monitoring software 334 are operatively configured to transmit a message to the display output 328 for presentation on the display unit 336 and also to present a audio tone to the audio output 326 for playing of an audio tone on the audio unit 338.

In one embodiment, the processor 324 may be a central processing unit ("CPU"), a application specific integrated circuit ("ASIC"), a microprocessor or any other suitable processing device. The memory 332 may include a hard disk, random access memory, cache, removable media drive, mass storage or configuration suitable as storage for data, instructions, and information. In one embodiment, the memory 332 and processor 324 may be integrated. The memory may use any type of volatile or non-volatile storage techniques and mediums. The network I/O device 330 may be a network interface card, a plain old telephone service ("POTS") interface card, an ASCII interface card, a wireless transceiver, or any other suitable network interface device. The messaging software 334, may be an a short messaging service program, a compiled program running, a process running on a microprocessor or any other suitable registration software.

In one embodiment, the monitoring unit 322 receives a message from the message monitoring unit via the network 334. The network I/O device 330 routes the message to the messaging software 334. The monitoring software 334 receives a message from the message monitoring software. The monitoring software 334 transmits the message to the display output 328 for display on the display unit 336. A user viewing the message on the display unit 336 has the option of confirming or denying the delivery of the message via the user input device. The monitoring software 334 sends the response received from the user input device 321 to the message monitoring unit 322.

Figure 4:
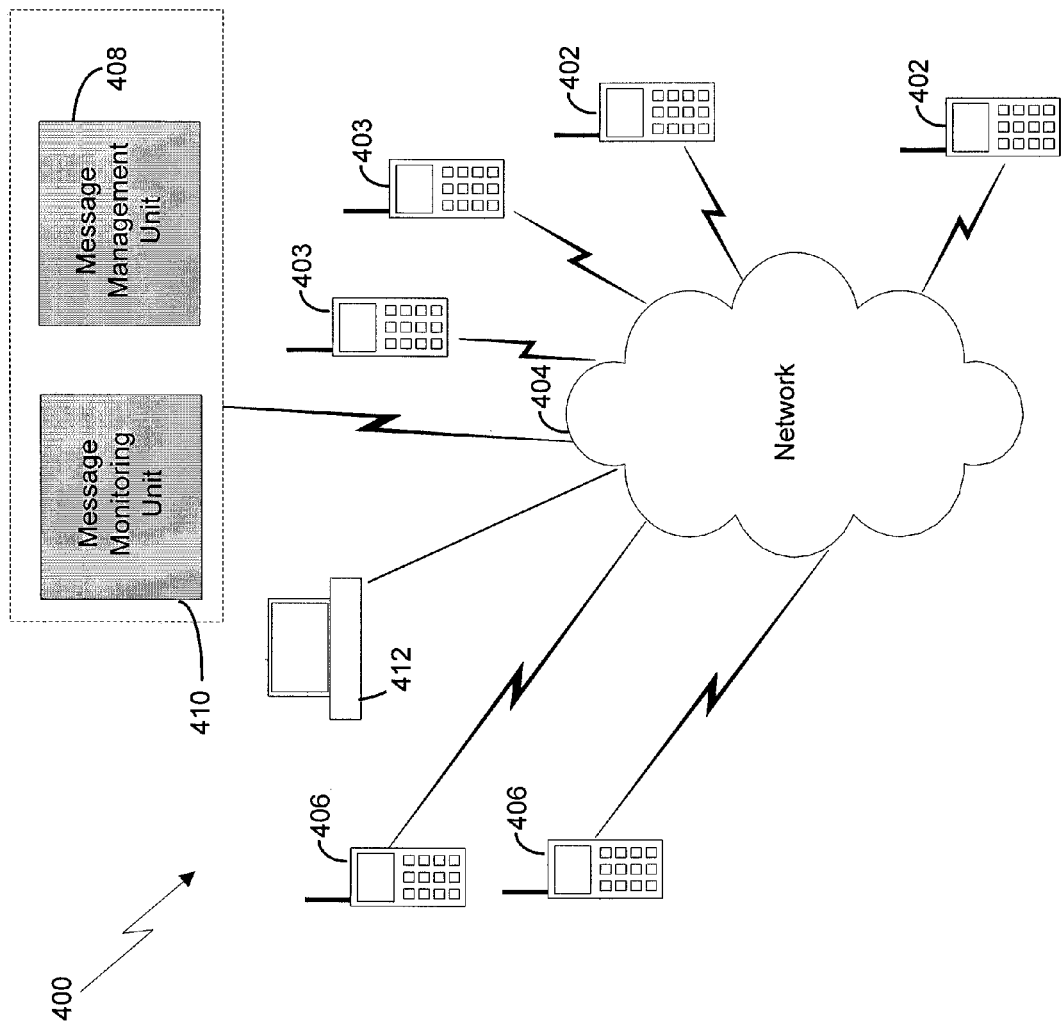
FIG. 4 is an illustrative example of one embodiment of the message filtering system which is consistent with the present invention.

FIG. 4 is an illustrative example of one embodiment of a message filtering system implemented according to the present invention. In this embodiment, a plurality of communications units 402 are connected to a network 404 along with a plurality of monitoring units 406, a message management unit 408, a message monitoring unit 410 and a terminal unit 412. A user may register addresses of communication devices 402 in the message management unit 408. In addition, a user may register addresses of communication devices 403 that are restricted from communicating with the registered communication devices 402. Once the addresses are registered, the user is shown a list of keyword identifiers which the user may select to trigger the re-routing of a message. As described previously, an alternate embodiment may use profile and profile ratings rather than the list of keyword identifiers for triggering the re-routing of messages.

When one of the plurality of communication devices 402 transmits a message to another communications unit 403, the message is first transmitted to the message management unit 408. Software operating on the message management unit checks the source communication device 402 address and the destination communication device 403 address with the list of registered communication device 402 addresses and restricted communication device 403 addresses. If the message source address is a restricted communication device 403 address, the message is not sent to the destination communication device 403 address. Alternatively, it should be understood that a user may choose not to block messages based upon addresses, and instead use one or more of an identifier list, profiles, or profile ratings to filter messages.

If the message is sent from a registered communication device 402 or a non restricted communication device 402, the message is transmitted to the message monitoring unit 410. The message monitoring unit 410 parses the message for identifiers, such as words, and compares each identifier located with a list of identifiers in a identifier database, a profile, or a profile rating stored in a library on the message monitoring unit 410. If the identifiers in the message match any one identifier in the identifier library or profile, or if the message has been given an incompatible content rating, the message is rerouted to at lease one monitoring unit 406. The monitoring unit 406 displays the message and prompts a user to approve the delivery of the message to the destination communication device 403 address. If the user denies the delivery, the message is stored in a message library on the message monitoring unit 410 and is not sent to the destination communication device address 403. If delivery of the message is permitted, the message monitoring unit 410 transmits the message to the message management unit 408 which routes the message to the destination communication device 403 address. In yet another embodiment, the message monitoring unit 410 and monitoring unit 406 are combined into a single device.

Because the message filtering system allows for real time monitoring of messages, messages can be monitored for inappropriate language or content. With the abundance of electronic messages generated each day, having the ability to automatically review and divert questionable messages reduces the time required to manage a data communication system. It is understood that, in one embodiment, live real time monitoring by the second device may be disabled, and messages determined to be acceptable by other automatic functions (i.e., identifier comparisons) may still be sent without secondary user intervention.

In yet another illustrative embodiment, when one of the plurality of communication devices 402 transmits a message to another communications unit 403, the message is first transmitted to the message management unit 408. Software operating on the message management unit checks the source communication device 402 address and the destination communication device 403 address with the list of registered communication device 402 addresses and identified communication device 403 addresses. If the message source address is an identified communication device address or a registered communication device 402 address, the message is sent to the destination communication device address and to at least one message monitoring unit 406. Additional messages sent between the source communication device 402 or destination communication device 403 are mirrored on the message monitoring unit 406. By allowing the mirroring of messages between two communication devices, a parent or a guardian of children is capable of monitoring communications between children and others thereby improving the security of communications between children and others.

Figure 5:
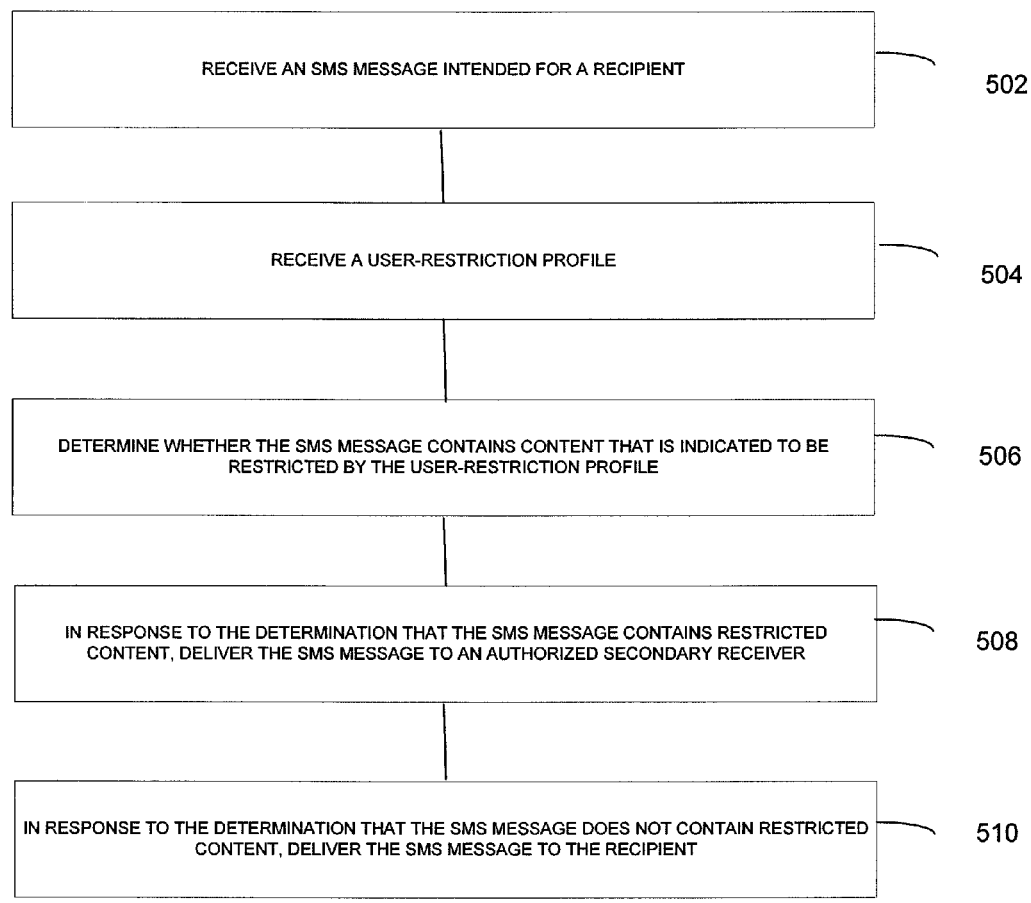
FIG. 5 is a flowchart of one embodiment of a method for analyzing SMS messages for restricted content.

FIG. 5 is a flowchart of a method for analyzing SMS messages for restricted content. In step 502, an SMS message intended for a recipient may be received. The recipient may be a user with message filtering enabled for themselves or their communication device, or may be another person with whom the user with message filtering enabled is attempting to communicate with. In other words, message filtering may occur for both inbound and outbound SMS messages in certain embodiments.

In order to obtain information regarding the necessity to filter a particular message, a user-restriction profile may be received in step 504. The user restriction profile may contain lists of content deemed inappropriate for a particular user, such as words or phrases. The user restriction profile may also contain an overall profile rating for embodiments in which message content is rated.

In one embodiment, a user-restriction profile may also pertain to the receiver of the SMS message. For example, if the receiver has restrictions on their ability to receive certain types of SMS messages, the recipient's user-restriction profile may be received and further actions may take place based on the receiver's profile.

Whether the SMS message contains content that is indicated to be restricted by the user-restriction profile may be determined in step 506. Based upon an evaluation of the message, such as comparing a word by word analysis or an overall rating that has been applied by a rating module with information contained within the received user-restriction profile, the determination can be made as to whether the SMS message includes restricted content. As described previously, an entire SMS message or portions of an SMS message may be rated separately, allowing portions of messages to be delivered, while excluding offensive portions. In one embodiment, excluded portions may include a message regarding the exclusion to inform a user of the reasons for missing portions.

In response to the determination that the SMS message contains restricted content, in step 508 the SMS message may be delivered to an authorized secondary receiver. An authorized secondary receiver may be a person or service tasked with the responsibility of reviewing SMS messages, such as a parent or a monitoring service provider hired by a child's parent to review questionable SMS messages. In some embodiments, the secondary receiver may simply be a server, such as a web server, that allows SMS messages to be compiled for later review by parents or other interested parties. Also, in delivering the SMS message to an authorized secondary party, the message may be sent for information purposes only (such as an alert), or, in other embodiments, the secondary party may have an override option with the ability to allow a message to be sent to the intended recipient despite being flagged as restricted. Allowing the secondary party the ability to override a message previously determined to include restricted content allows greater flexibility in cases where unknown words appear in messages or any number of other circumstances where an SMS message is mistakenly flagged as restricted.

In step 510, in response to the determination that the SMS message does not contain restricted content, the SMS message may be delivered to the recipient. The determination may be made automatically and without user intervention, as described previously, but the determination may also be made by the secondary user when the SMS message is sent to the secondary user for review.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method for analyzing SMS messages for restricted content, said method comprising:
   receiving an SMS message intended for a recipient;
   receiving a user-restriction profile;
   determining whether the SMS message contains content that is indicated to be restricted by the user-restriction profile, wherein determining whether the SMS message contains restricted content further includes determining which portions of the SMS message contains restricted content and which portions do not contain restricted content;
   in response to the determination that the SMS message does not contain restricted content, delivering the SMS message to the recipient; and
   in response to the determination that the SMS message contains at least a portion of restricted content and a portion of nonrestricted content, separating the SMS message into the portion of restricted content and the portion of nonrestricted content, delivering the portion of nonrestricted content of the SMS message to the recipient, while restricting delivery of the portion of restricted content of the SMS message to the recipient and delivering the SMS message to an authorized secondary receiver.

2. The method according to claim 1, wherein receiving a user-restriction profile includes receiving a user-restriction profile associated with a sender of the SMS message.

3. The method according to claim 1, wherein determining whether the SMS message contains restricted content includes determining whether any words within the SMS message are indicated as restricted by the user-restriction profile.

4. The method according to claim 1, further comprising populating the user-restriction profile by the authorized secondary receiver with identifiers that are to be restricted.

5. The method according to claim 1, further comprising determining whether the SMS message includes images that have been indicated as restricted.

6. The method according to claim 5, wherein determining whether the SMS message includes restricted images further includes analyzing the images with software able to detect features of the image and comparing the features to items marked as restricted within the user-restriction profile.

7. The method according to claim 1, further including determining an SMS content rating for the SMS message that was received.

8. The method according to claim 7, wherein determining whether the SMS message contains content that is indicated to be restricted by the user-restriction profile includes determining an SMS content rating and comparing the SMS content rating to the user profile rating.

9. A message filtering system comprising:
   a message management unit including a processor and memory; and
   a message monitoring unit, including a processor and memory, in communication with the message managements unit, wherein the message monitoring unit is configured to:
   receive at least one SMS message intended for a recipient;
   receive a user-restriction profile;
   determine whether the SMS message contains content that is indicated to be restricted by the user-restriction profile, wherein determining whether the SMS message contains restricted content further includes determining which portions of the SMS message contains restricted content and which portions do not contain restricted content;
   in response to the determination that the SMS message does not contain restricted content, deliver the SMS message to the recipient: and
   in response to the determination that the SMS message contains at least a portion of restricted content and a portion of nonrestricted content, separate the SMS message into the portion of restricted content and the portion of nonrestricted content, delivering the portion of nonrestricted content of the SMS message to the recipient, while restricting delivery of the portion of restricted content of the SMS message to the recipient and delivering the SMS message to an authorized secondary receiver.

10. The message filtering system according to claim 9, wherein, in receiving a user-restriction profile, the message monitoring unit is further configured to receive a user-restriction profile associated with a sender of the SMS message.

11. The message filtering system according to claim 9, wherein, in determining whether the SMS message contains restricted content, the message monitoring unit is further configured to determine whether any words within the SMS message are indicated as restricted by the user-restriction profile.

12. The message filtering system according to claim 9, wherein the message monitoring system is further configured to populate the user-restriction profile by the authorized secondary receiver with identifiers that are to be restricted.

13. The message filtering system according to claim 9, wherein the message monitoring system is further configured to determine whether the SMS message includes images that have been indicated as restricted.

14. The message filtering system according to claim 13, wherein, in determining whether the SMS message includes restricted images, the message monitoring system is further configured to analyze the images with software able to detect features of the image and comparing the features to items marked as restricted within the user-restriction profile.

15. The message filtering system according to claim 9, wherein the message monitoring system is further configured to determine an SMS content rating for the SMS message that was received.

16. The message filtering system according to claim 15, wherein, in determining whether the SMS message contains content that is indicated to be restricted by the user-restriction profile, the message monitoring system is further configured to determine an SMS content rating and compare the SMS content rating to the user profile rating.

* * * * *